US008706852B2

(12) United States Patent
Kunze et al.

(10) Patent No.: US 8,706,852 B2
(45) Date of Patent: Apr. 22, 2014

(54) AUTOMATED SCALING OF AN APPLICATION AND ITS SUPPORT COMPONENTS

(75) Inventors: Tobias Kunze, Palo Alto, CA (US); Ram Ranganathan, Palo Alto, CA (US)

(73) Assignee: Red Hat, Inc., Raleigh, NC (US)

( * ) Notice: Subject to any disclaimer, the term of this patent is extended or adjusted under 35 U.S.C. 154(b) by 169 days.

(21) Appl. No.: 13/216,009

(22) Filed: Aug. 23, 2011

(65) Prior Publication Data

US 2013/0054776 A1  Feb. 28, 2013

(51) Int. Cl.
G06F 15/177 (2006.01)
G06F 15/173 (2006.01)
H04L 12/26 (2006.01)
H04J 3/16 (2006.01)
G06F 3/00 (2006.01)

(52) U.S. Cl.
USPC ........... 709/221; 709/223; 709/224; 709/225; 709/201; 370/252; 370/468; 719/328

(58) Field of Classification Search
USPC .................. 709/223–229; 718/104; 719/328; 370/252, 468
See application file for complete search history.

(56) References Cited

U.S. PATENT DOCUMENTS

| 6,915,338 | B1 * | 7/2005 | Hunt et al. ..................... 709/220 |
| 7,900,206 | B1 * | 3/2011 | Joshi et al. .................... 718/104 |
| 2003/0126240 | A1 * | 7/2003 | Vosseler ........................ 709/221 |
| 2005/0149940 | A1 * | 7/2005 | Calinescu et al. ............ 718/104 |
| 2005/0243729 | A1 * | 11/2005 | Jorgenson et al. ............ 370/241 |
| 2009/0031307 | A1 * | 1/2009 | Chodroff et al. .............. 718/100 |
| 2010/0220622 | A1 * | 9/2010 | Wei ............................... 370/252 |
| 2011/0225017 | A1 * | 9/2011 | Radhakrishnan ............ 705/7.25 |
| 2011/0239227 | A1 * | 9/2011 | Schaefer et al. .............. 719/313 |
| 2012/0185913 | A1 * | 7/2012 | Martinez et al. ................. 726/1 |
| 2013/0204849 | A1 * | 8/2013 | Chacko, Peter ............... 707/692 |

* cited by examiner

Primary Examiner — Joseph E Avellino
Assistant Examiner — Aftab Nasir Khan
(74) Attorney, Agent, or Firm — Lowenstein Sandler LLP (57) ABSTRACT

An execution environment provides a plurality of components that support execution of an application, wherein the plurality of components and the application are hosted by a plurality of nodes arranged in one or more clusters. The execution environment monitors runtime behavior of the application and the plurality of components, and generates a scaling event based on a comparison of the runtime behavior to one or more scaling policies. The execution environment automatically scales at least one of the application or a component of the plurality of components if the scaling event does not violate a constraint, wherein the scaling comprises adding a new node to at least one cluster of the one or more clusters or removing a node from at least one cluster of the one or more clusters based on the scaling event.

20 Claims, 8 Drawing Sheets

AUTOMATED SCALING OF AN APPLICATION AND ITS SUPPORT COMPONENTS

TECHNICAL FIELD

Embodiments of the present invention relate to managing an application and its execution environment, and more specifically to automatically scaling an application and/or its support components. Some embodiments of the present invention relate to an automatically scalable platform as a service (PaaS).

BACKGROUND

Most web applications require multiple layers of functionality to operate. For example, a common web application may require a database layer, an application server layer and the actual web application layer. Components within each of these layers may have its own resource requirements, dependencies, and so forth. Additionally, these components may operate on a single machine or may operate on different machines. As load on the web application changes, it may be desirable to scale up or scale down the web application. This may include bringing online additional machines that host additional instances of one or more of the layers or taking such machines offline. The management of such scaling can be quite complex, and is conventionally performed manually by a network administrator.

BRIEF DESCRIPTION OF THE DRAWINGS

Embodiments of the present invention are illustrated by way of example, and not by way of limitation, and can be more fully understood with reference to the following detailed description when considered in connection with the figures in which.

DETAILED DESCRIPTION

Described herein are methods and systems for automatically scaling an application such as a web application. An application (also referred to as a program) may depend on several support components. Embodiments of the present invention provide a platform (also referred to herein as a runtime environment) that provides these support components. The application and the support components may be hosted by multiple nodes arranged into a cluster or multiple clusters. In one embodiment, the application and components are arranged into groups, and each group runs on a separate cluster. The platform monitors runtime behavior of components and applications, and generates a scaling event based on a comparison of the runtime behavior to one or more scaling policies. Scaling events may be generated when policies are violated by monitored runtime behavior. The platform automatically scales the components and/or applications based on the scaling events. Scaling up an application or component includes adding a new node to a cluster that hosts the application or component. Scaling down an application or component includes shutting down a node from the cluster that hosts the application or component.

For conventional hosted applications such as web applications, determining when and how to scale the applications can be quite complex. Accordingly, application providers typically invest considerable resources into manually developing scaling strategies. Often these scaling strategies are sufficient for a current version of an application, but will not work for a next version of the application, or will not work if parameters deviate from assumptions. Embodiments of the present invention provide a platform (execution environment) that automatically handles all scaling tasks. The platform can adapt to changing demands and input parameters to continually provide an optimal amount of resources for an application and support components of the application. This enables the application provider to focus efforts on the business logic of the application, without having to worry about any of the underlying infrastructure.

Moreover, traditional web applications are statically deployed with a fixed architecture. For example, most web application deployments include a first tier that consists of a static web server that runs on a first node or node cluster, a second tier that consists of an application server that runs on a second node or node cluster and a third tier that consists of a backend service that runs on a third node or node cluster. In conventional web application deployments, the division of these separate components on separate nodes or node clusters is fixed. In contrast, embodiments of the present invention provide a flexible multi-tier application deployment, in which groups of components that run on specific nodes or node clusters may automatically change during execution. For example, in embodiments of the present invention, two groups running different components may merge, a group may split into multiple groups, a component of one group may be migrated to another group, and so on based on monitored runtime behavior. This can improve an efficiency of resource utilization and maximize performance of web applications in an automated manner.

Figure 1A:
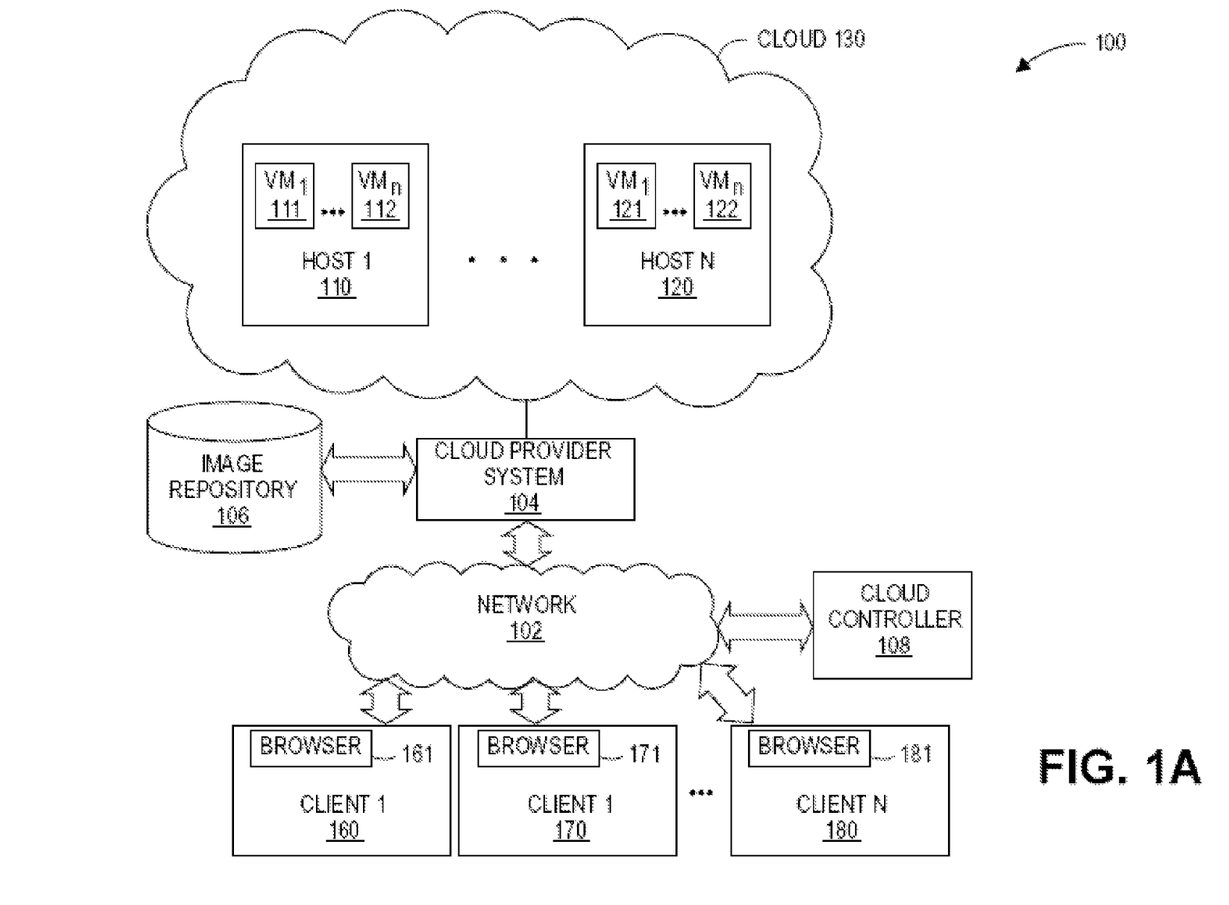
FIG. 1A is a block diagram of a network architecture in which embodiments of the invention may operate.

FIG. 1A is a block diagram of a network architecture 100, in which embodiments of the invention may operate. The network architecture 100 includes a cloud 130 managed by a cloud provider system 104. The cloud 130 provides virtual machines, such as virtual machines 111, 112, 121, and 122. Each virtual machine is hosted on a physical machine configured as part of the cloud 130. Such physical machines are often located in a data center. For example, virtual machines 111 and 112 are hosted on physical machine 110 in cloud 130 provided by cloud provider 104. The cloud provider system 104 and cloud 130 may be provided as an infrastructure as a service (IaaS) layer. The cloud provider system 104 and cloud 130 may be provided by, for example, Amazon's® Elastic Compute Cloud (EC2®). Users can interact with applications executing on cloud-based virtual machines using client computer systems, such as clients 160, 170 and 180, via corresponding web browser programs 161, 171 and 181.

Clients 160, 170 and 180 are connected to hosts 110, 120 and the cloud provider system 104 via a network 102, which may be may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of applications in the cloud 130. In one embodiment, the cloud controller 108 provides platform packages associated with different applications to the cloud provider 104. As will be discussed in more detail below, a platform package is a pre-generated image that can be provided to the cloud provider 104 and stored in an image repository 106. This image may be a virtual machine image or an image of a physical system. Upon receiving a command identifying a specific platform package, the cloud provider 104 retrieves the corresponding image from the image repository 106, creates an instance of it and loads it on the host 110, 120 to run on top of a hypervisor (not shown). The command may be received from the cloud controller 108 or a user (e.g., a system administrator) via a console computer or a client machine. The image repository 106 may reside locally or remotely and may represent a single data structure or multiple data structures (databases, repositories, files, etc.) residing on one or more mass storage devices, such as magnetic or optical storage based disks, solid-state drives (SSDs) or hard drives.

The image repository 106 may also store application packages and/or support component packages, which may be loaded onto a host and run on a hypervisor in a similar manner as the platform packages. The cloud provider 104 or the cloud controller 108 may also load an application package on the host 110, 120 to run on top of the platform package or on top of a component package. Additionally, application packages and/or component packages may be stored in one or more other repositories (not shown) residing locally or remotely instead of, or in addition to, the image repository 106.

One example of support component packages are cartridges. Cartridges are component packages that include one or multiple support components along with additional information identifying abstract features provided by the support components. Cartridges may share a similar construction, such that cartridges can be loaded and unloaded from the platform core during execution in accordance with needs of the application 240 or other installed components.

As the number of clients 160, 170, 180 accessing applications running on hosts 110, 120 changes, the load on the applications changes. If the load becomes too high, then a lag may be introduced for some clients 160, 170, 180. Additionally, if the load becomes very low, then some hosts 110, 120 may run practically idle, wasting resources. In one embodiment, the platform included in the virtual machines 111, 112, 121, 122 includes a mechanism to monitor runtime behavior of the application and support components. The platform may determine, for example, load on multiple different components and on the application itself using one or multiple monitored metrics. The platform may then automatically determine when to scale up or scale down the application (or any of the support components).

In one embodiment, when a scaling decision is made, the platform sends a scaling request to the cloud controller 108. The cloud controller 108 then communicates with the cloud provider system 104 to request that a new node be allocated for the platform or that an existing node be de-allocated. A new node may include a new host and/or a new virtual machine running on a new or existing host. The cloud provider system 104 then allocates the new node (or de-allocates an existing node), and informs the platform of the new node. The platform then integrates the new node into an existing cluster (weaves the new node into the platform fabric). The platform may vary, for example, between 5 machines running at peak times and 1 machine running at off peak times.

Figure 1B:
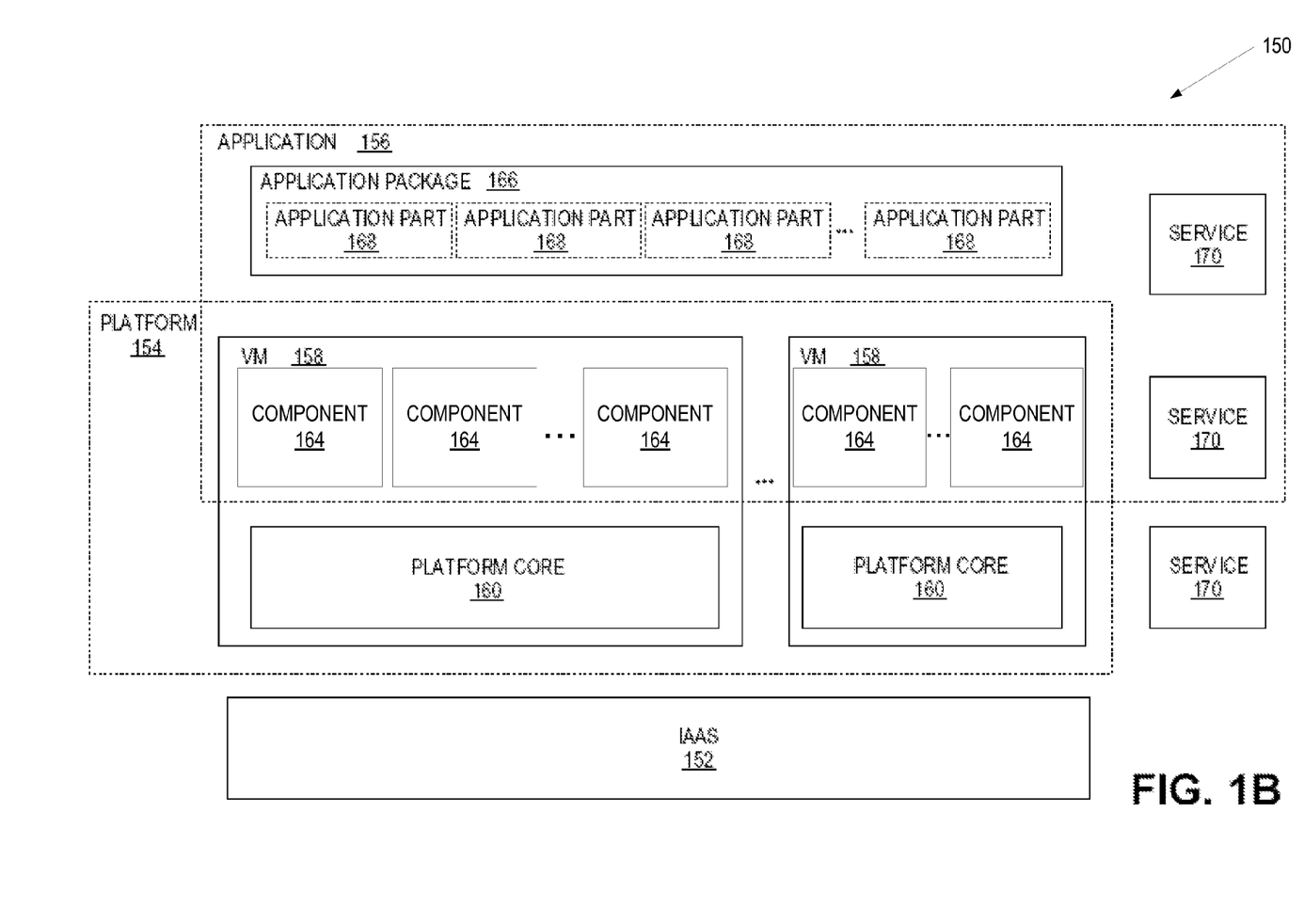
FIG. 1B is a block diagram of one embodiment of a Platform-as-a-Service (PaaS) approach for facilitating the execution of a web application in a cloud.

FIG. 1B is a block diagram of one embodiment of a Platform-as-a-Service (PaaS) environment 150 for facilitating the execution of a web application (or other application) in a cloud. The PaaS environment 150 includes an Infrastructure-as-a-Service (IaaS) 152, which consists of hardware (e.g., one or more processors, memory, IO devices, etc.) and a hypervisor, and a platform 154 running on the IaaS 152. The platform 154 may be delivered as an auto-clustering virtual machine image (or multiple different auto-clustering virtual machine images), resulting in one or more virtual machines 158, each containing a platform core 160 and a one or more components 164. Each VM 158 may be a node of the platform 154.

The platform core 160 may include a guest OS with a kernel, distributed services, a data transport, data services, monitors and/or other functionality. Distributed services allow communication between nodes when the application runs on multiple nodes arranged in a cluster executing on one or more hypervisors in one or more hosts. Each node may include a separate instance of the platform 154, or may include a different subset of the platform (e.g., a specific component or components of the platform). The monitors receive monitoring data from the guest OS and kernel, and pass it to the data services that store this data in a data store inside the platform 154 and allows querying of this data by the user(s) and/or client(s). The monitoring data may describe the behavior and measure the performance of components 164, elements of hardware and the application 156. The data transport communicates data between different components 164 of the platform 154 and between different platforms when applicable. Some embodiments of the platform core 160 are described with reference to FIG. 2 below.

The components 164 form a layer (or multiple layers) that provides a variety of middleware, framework and other support software for the application 156. In various embodiments, the middleware/framework components 164 can include such components as Java®, Apache®, MySQL®, PHP®, JBoss®, and Tomcat®.

Application 156 includes an application package 166 containing multiple application parts 168 which may correspond to different individually deployable modules of the application. For example, a first application part 168 may include application code or logic, and another application part 168 may include static data that will be farmed out to a content delivery network. Application 156 may be an n-tiered web application based on languages such as Java, Ruby, Python, PHP or the like. The PaaS environment 150 may also include external services 170 on which the application 156 depends.

An application package 166 may be provided by a user or created automatically based on information about the application that is provided by a user via a user interface or by other means. The platform core 160 and components 164 may be provided by the PaaS provider. Components 164 are not packaged with the application 156. Instead, the application package 166 expresses a dependency on platform services provided by components 164. The platform 154 may then import the appropriate components 164 at deployment time.

The platform 154 automates the process of scaling the application 156. The platform 154 may cause new VMs 158 with various components 164 and a platform core 160 to be provisioned during runtime of the application 156 (e.g., on-the-fly). The platform 154 may additionally cause existing VMs 158 to be powered down during runtime of the application. Accordingly, the platform 154 provides a virtually care-free runtime environment for the application 156.

Figure 2:
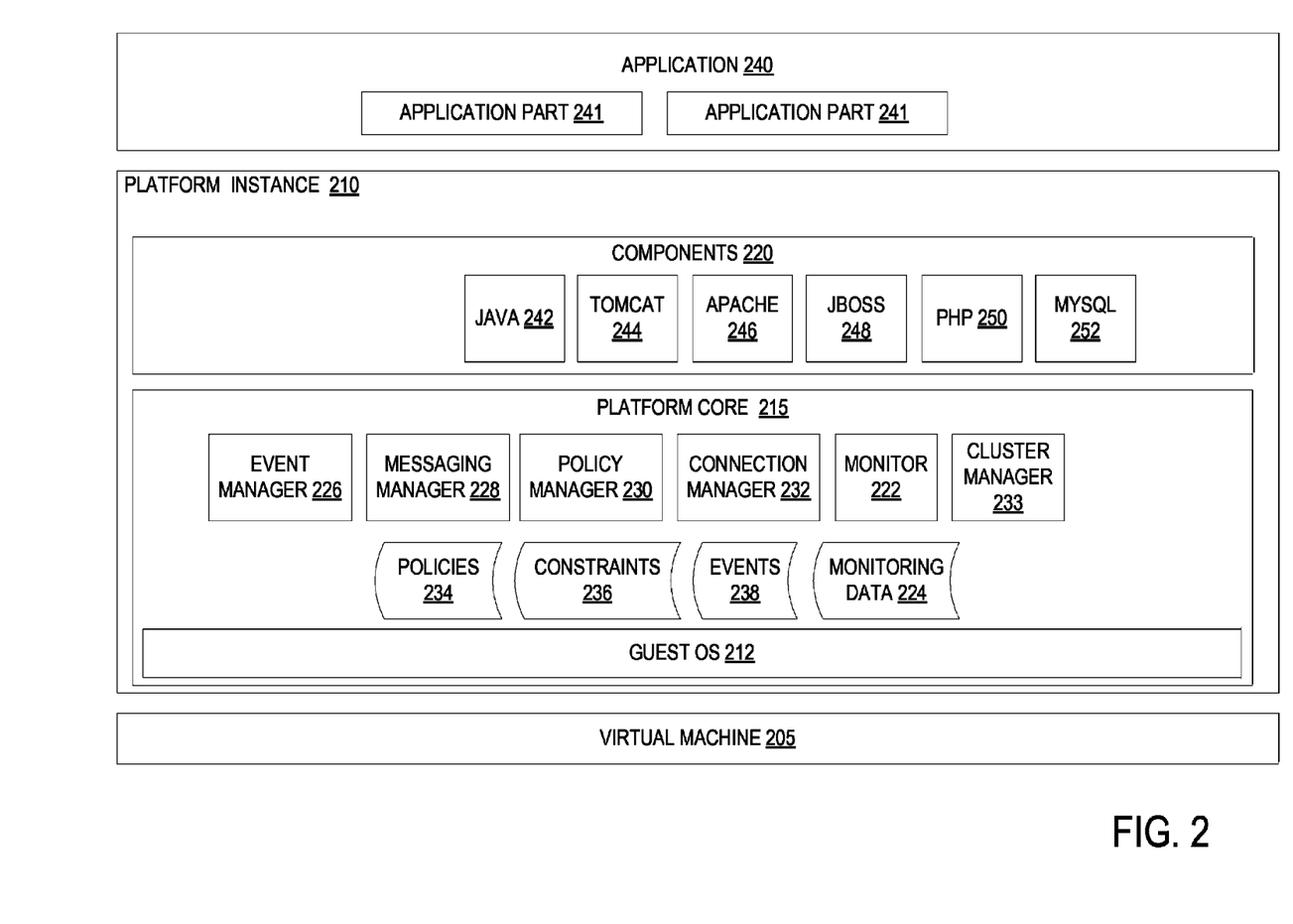
FIG. 2 is a block diagram of a platform instance that hosts an application and runs in a virtual machine, in accordance with one embodiment of the present invention.

FIG. 2 is a block diagram of a platform instance 210, in accordance with one embodiment of the present invention. The platform instance 210 supports execution of an application 240. The application 240 may be a web application or another type of application. In one embodiment, the application is a Java application or a PHP application. The application may include multiple application parts 141 (also referred to as application components). The platform instance 210 runs on a virtual machine 205, which in turn runs on a host that includes a hypervisor. The platform instance 210 includes a platform core 215 and one or more components 220.

Components 220 may each provide support functionality required by the application 240 and/or by other components 220. Examples of components include a Java component 242, a Tomcat component 244, an Apache component 246, a JBoss component 248, a PHP component 250 and a MySQL component 252. However, many other types of components are also possible. Each component 220 provides specific capabilities. Application 240 may identify specific capabilities that application 240 requires to run. Those components 220 that provide the specified capabilities may be loaded in the platform instance 210 (or in another platform instance that may communicate with platform instance 210). Additionally, some of the components may specify additional capabilities that those components rely upon. If any such components 220 will be loaded into platform instance 210, then the additional components that provide the capabilities that those components rely upon may also be loaded into the platform instance 210 (or into another platform instance).

The components 220 can issue commands to request system information such as information about the architecture and packages installed, and can further communicate with the platform via communication channels such as the file system, interprocess communication (IPC), and a network. In addition, the components 220 and application 240 can trigger events such as threshold violations, scaling events, notification triggers, etc.

Each component 220 may include a probe (not shown) that generates monitoring data that can (1) directly describe the behavior and measure the performance of the instrumented component(s), and/or (2) indirectly describe the behavior and measure the performance of other components of the platform, elements of hardware, and/or the application 240. In one embodiment, the probes include hooks. The hooks may hook requests such as execution requests (e.g., hypertext transport protocol (HTTP) requests). Examples of such requests include an application request (from a client to the application 240), a service request from the application to one or more components, requests from components to other components, requests to external services that are not included in the platform, and so on. Hooks may also hook responses (e.g., responses to any of the above enumerated requests). In other embodiments, monitoring data may be collected in other ways. For example, monitoring data may be gathered by monitoring an information stream (of requests and responses) and/or actively mining data from the information stream. This monitoring data 224 may be sent to a monitoring subsystem 222 or monitors included in the platform core 215. Examples of monitoring data include data on timings (e.g., amount of time between receiving request and sending response), input/output (I/O) traffic (e.g., network bytes in and out), and so on.

Each component may include or be associated with a constraint or set of constraints 236. The constraints 236 specify requirements or reservations of the component. Examples of constraints 236 include minimum processor power, minimum number of processor cores, minimum memory, minimum bandwidth, maximum allowed packet loss rate, minimum security settings, additional required components, other components that cannot run with a component in a platform instance, and so forth. The constraints 236 may be used to provision the virtual machine 205 and/or an underlying host, and may be further used to make scaling decisions.

Each component 220 may additionally include or be associated with one or more policies 234. Policies may be based on numbers of requests, CPU usage, RAM usage, I/O traffic, number of threads that an application or component can provide, number of requests, and so forth. One example of a policy for a component causes a scale up event to be generated if the average CPU load on the machine hosting this component goes above 80% for 5 minutes. Another example of a policy causes a scale down event to be generated after 5 minutes of idle time. Policies may be modified by an administrator during runtime and/or while the components are offline.

In one embodiment, at least some components 220 are provided by cartridges (not shown). Cartridges are software packages that provide functionality of one or more components 220. Each cartridge may include policies and/or constraints, and may trigger scaling events. Components may also be built into the platform and/or may be included in an application package.

The platform core 215 provides a framework that enables components and the application 240 to communicate with one another, and that enables the platform instance 210 to communicate with (and form clusters with) other platform instances running on other nodes. The platform core 215 also includes functionality for managing the application 240 and components 220, and for scaling the numbers and types of platform instances. In one embodiment, the platform core includes a guest operating system (OS) 212, a monitoring subsystem 222, a connection manager 232, a policy manager 230, a messaging manager 228, an event manager 226 and a cluster manager 233.

Monitoring subsystem 222 receives monitoring data 224 from components 220, application 240 and operating system 212 during the execution of the application 240. Monitoring data includes data on the runtime behavior of the application 240 and support components 220. Monitoring data may include, for example, data on timings (e.g., amount of time between receiving request and sending response), input/output (I/O) traffic (e.g., network bytes in and out), CPU utilization (e.g., for each component), memory footprint, number of requests that an application is serving per node, how long an application spends servicing a request on average, latency of responding to a request or of fetching data, and so on. Monitoring subsystem 222 may store this monitoring data 224 in a data store (not shown). Each of these metrics may be separately identified for each component and for the application 240. For example, a CPU utilization of Java component 242 and a CPU utilization of Tomcat component 244 may separately be determined. In one embodiment, monitoring subsystem 222 maintains a record of historical monitoring data.

In one embodiment, platform core 215 includes a policy manager 230. Policy manager 230 compares monitoring data 224 (including historical monitoring data and/or current monitoring data) to one or more policies 234, and determines whether any scaling events should be triggered. In one embodiment, platform core 215 includes a single policy 234 that includes scaling rules for multiple components 220 and for the application 240. Alternatively, components and/or cartridges, application 240, a particular platform instance, groups of nodes, etc. may each include separate policies.

Policy manager 230 may trigger scaling events 238 when scaling policies 234 are violated. In one embodiment, policy manager 230 evaluates monitoring data 224 on a periodic basis (e.g., every 5 minutes) to determine whether to trigger any scaling events 238. Policies 234 may include thresholds which, if exceeded, trigger a scaling event 238. Additionally, each component 220 may trigger a scaling event 238 based on comparison of monitoring data for that component to that component's policies. The platform may also trigger other types of events, such as a notification event or messaging event when an application is started or a new node joins a cluster, for example.

In one example, each instance of application 240 may be able to serve at most 15 requests per second. Application 240 may include a first policy that specifies that a scale up event should be generated if 12 or more requests per second are being served. Application 240 may also include a second policy that specifies that a scale down event should be generated if 5 or fewer requests per second are being served. In a further example, application 240 may include a combinatorial policy that causes the policy manager 230 to adjust, for example, the threshold of 12 requests per second upwards if an average CPU load is less than 50% when 12 requests per second are being processed.

In one embodiment, scaling events 238 are sent to event manager 226. Event manager 226 makes scaling decisions based on the received scaling events 238. In one embodiment, event manager 226 makes scaling decisions on a periodic basis (e.g., every 5 minutes). In another embodiment, scaling manager 226 makes scaling decisions as scaling events are received. Some scaling events may be mutually exclusive, or may conflict in some way. Accordingly, event manager 226 performs conflict resolution on the multiple scaling events, and determines which (if any) scaling events to process. For example, a first component that runs on a first platform instance may generate a first scaling event, and a second component that runs on a second platform instance may generate a second scaling event. However, a deployment constraint may specify that no more than 5 nodes may be used for the application deployment, and currently there may be 4 nodes running for the application deployment. Therefore, the event manager 226 would determine whether to add a new node to run another copy of the first platform instance in accordance with the first scaling event or whether to add a new node to run another copy of the second platform instance in accordance with the second scaling event.

Messaging manager 228 communicates with a cloud controller. When a scaling decision is made by event manager 226, event manager 226 notifies messaging manager of the decision. Messaging manager 228 then sends a message to the cloud controller to cause the cloud controller to communicate with the IaaS layer to provision a new node (or shut down an existing node).

Once new nodes are brought online, cluster manager 233 adds the new nodes to an appropriate cluster, and performs load balancing on that cluster to redistribute load. For example, if a new node is added, cluster manager adds the new node to an appropriate cluster and distributes load to the new node. In one embodiment, cluster manager 233 makes sure that the new machine shares a common file system with other nodes in a cluster. The cluster manager 233 may also make sure that the other nodes in the cluster know about the new node, that all relevant software is installed on the new node (e.g., that necessary components are installed on the new node), that the new node is synchronized with existing nodes in the cluster, and so on. When nodes are taken offline, cluster manager 233 redistributes load among the existing nodes.

Connection manager 232 manages connections between components 220. Connection manager 232 also manages connections between the application 240 (or application components) and various components 220. Each component 220 and the application 240 (or application component) may expose one or multiple connection points. Components 220 (or an application 240 or application component) that provides a connection point may provide it as a subscription service. Any other component 220 (or application 240 or application component) may subscribe to that subscription service. For example, a server may publish a network connection endpoint. Any client may then subscribe to that network connection endpoint to connect to the server. The connection manager 232 sits in the middle and manages the connection between the endpoints. For example, if one endpoint (connection publisher) moves, then the connection manager 232 may inform or update (either actively or passively) the other endpoints (connection subscribers) of the new address for the moved endpoint. In one embodiment, connection manager 232 updates connections after a scaling event is performed. For example, if a new node is brought online, then a connection may be updated by notifying components and/or the application to add addresses of one or more components within the new node to the connection.

Connection manager 232 may manage multiple different types of connections. One type of managed connection is a network connection, which may include a network address and a port (or network addresses and ports). Another connection type is a connection via a file system. For example, one endpoint may write a file or a library to a location in the file system, and the other endpoint may read that file or library. As one endpoint moves around, or begins using a different directory, the connection manager 232 can inform the other endpoint of the move or different directory. The connection manager 232 may also manage in process connections, such as loading of a shared object, pipes, interprocess communications (IPC), shared memory connections, and so on. All of these and other types of connections may be managed by connection manager 232 using the publish subscribe system.

In one embodiment, each VM 205 includes the same platform instance 210 and an instance of the application 240. Accordingly, each machine runs an instance of all components provided by the platform. Therefore, when the system scales up the application, a new VM 205 includes a new copy of the application 240 and all components 220.

In another embodiment, different VMs include distinct platform instances. For example, a first platform instance may include a Java component 252 and host the application 240, and a second platform instance may include a MySQL component 252. Nodes that include the first platform instance may be grouped into a first cluster, and nodes that include the second platform instance may be grouped into a second cluster. This division of the platform into multiple different platform instances, which may communicate with one another, increases the flexibility and level of control over the platform.

Figure 3:
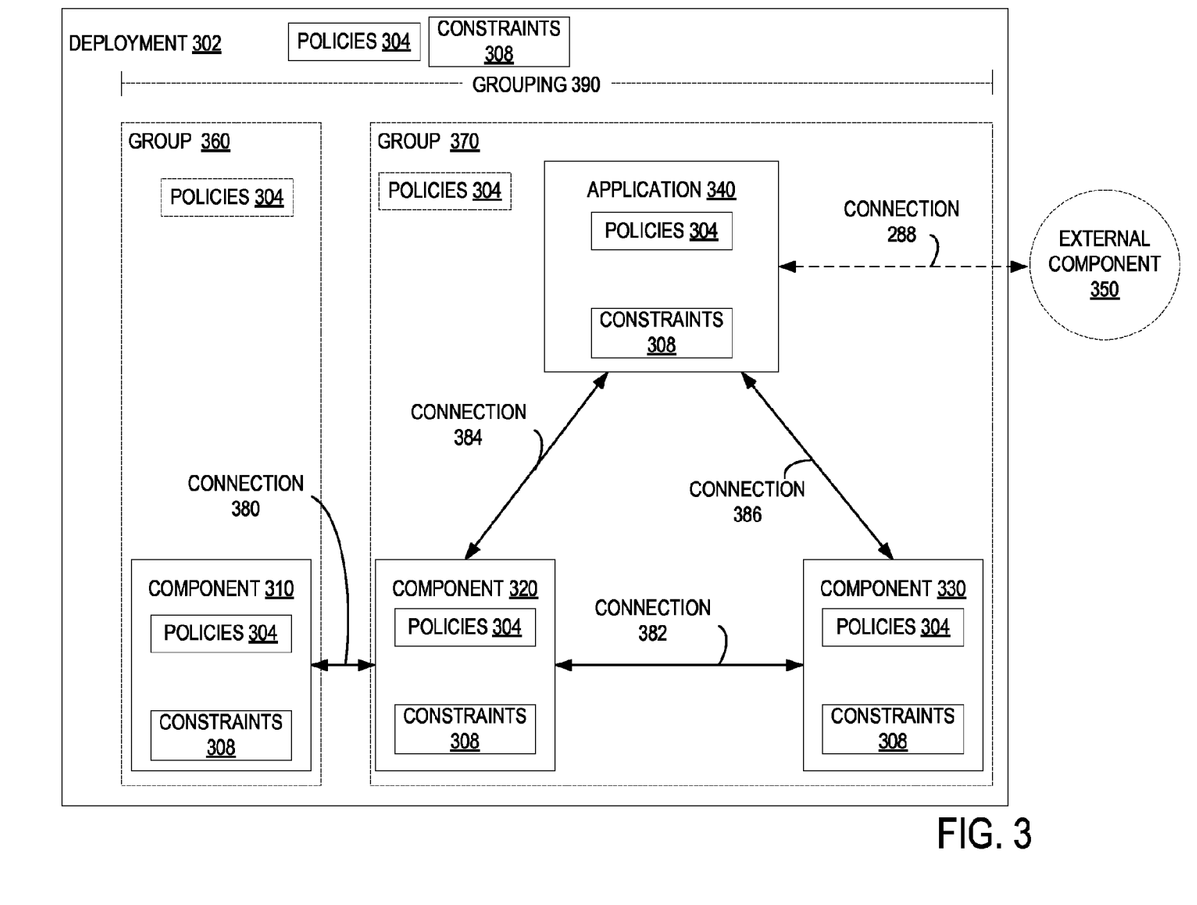
FIG. 3 illustrates a logical architecture of an application deployment, in accordance with one embodiment of the present invention.

FIG. 3 illustrates a block diagram of a logical architecture of a deployment 302 for an application 340, in accordance with one embodiment of the present invention. A deployment 302 is a collection of platform instances that form a platform and an application that runs on the platform.

The deployment 302 includes a collection of components 310, 320, 330 and an application 340. The components 310, 320, 330 and application 340 communicate via a series of connections. In the illustrated example, component 310 communicates with component 320 via connection 380. Component 320 communicates with application 340 via connection 384 and with component 330 via connection 382. Additionally, application 340 communicates with component 330 via connection 386. Multiple different types of connections may be used, such as network connections, shared memory connections, shared directory connections, and so forth. Additionally, two components (or a component and the application 340) may form multiple different types of connections between them. The application 340 and/or components 310, 320, 330 may also form connections (e.g., connection 288) with an external component 350. The external component may be, for example, a web service utilized by the application 340. The connections enable components and the application to utilize services and functionality provided by other components.

The deployment 302 includes a grouping 390. The grouping 390 is an arrangement of components 310, 320, 330 and application 340 in the deployment 302 into one or more provisioning groups 360, 370. Each provisioning group 360, 370 may represent a tier of the application deployment 302. Each provisioning group 360, 370 is a cluster of nodes that each include the same platform instance (and thus that each includes the same component or components. In one embodiment, each node in a provisioning group is identical to each other node in the provisioning group. For example, all nodes in provisioning group 360 may include a machine with four processor cores and 2 GB of RAM, and may host a platform instance that includes component 310. In one example deployment, provisioning group 360 may be a web serving tier and component 310 may be a web server. Provisioning group 360 may be a second tier that includes an application server (component 320), application code that is deployed into that application server (application 340), and a database (component 330).

Automatic scaling may be performed for each provisioning group 360, 370. For example, if provisioning group 360 experiences heavy load, a new node may automatically be added to provisioning group 360. In addition to scaling provisioning groups automatically, the system may automatically adjust the grouping 390. For example, the system may automatically remove component 320 from provisioning group 370 and add component 320 to provisioning group 360. Accordingly, at any time the grouping 390 may change and/or the number of nodes in the provisioning groups 360, 370 may change. For example, provisioning group 370 may split, so that component 330 forms a separate data tier in a new provisioning group.

Any entity can have policies 304 that govern scaling. For example, the deployment 304, each group 360, 370, each component 310, 320, 330, cartridges (not shown) and/or application 340 may include scaling policies 304. Each of the scaling policies 304 may include one or more rules that specify conditions that trigger scaling events. Additionally, each entity may include constraints 310 that indicate requirements of the specific entity.

Any entity can register events that affect scaling decisions. These events may be generated by the entities based on violation of that entity's policies 304. This enables every entity in the deployment 302 to inform scaling decisions. An event manager may then determine what scaling to perform after receiving one or multiple scaling events and comparing those scaling events to all applicable constraints 308. Thus, the system is able to make an informed scaling decision based on information regarding metrics and requirements of every level of the deployment 302, from hardware components, to individual components, to provisioning groups, and all the way up to the deployment 302.

Figure 4:
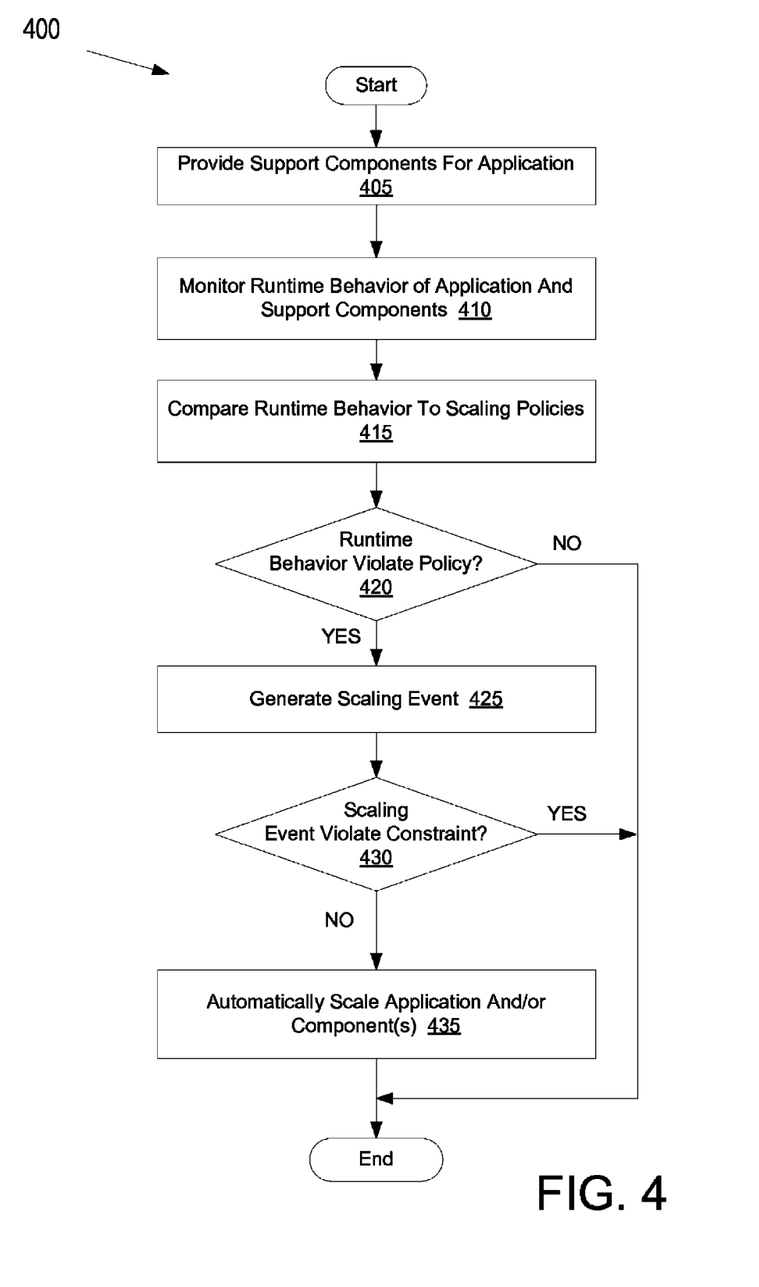
FIG. 4 is a flow diagram of one embodiment for a method of automatically scaling an application.
Figure 5:
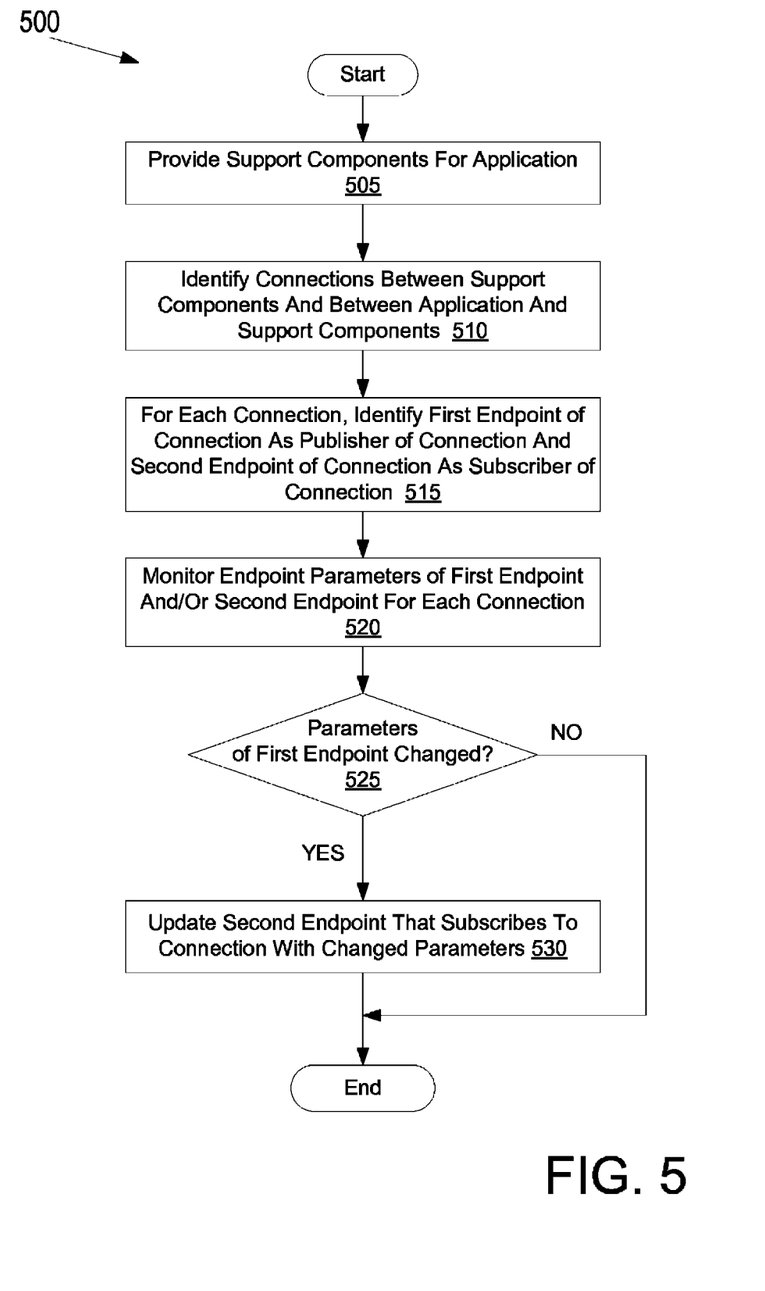
FIG. 5 is a flow diagram of one embodiment for a method of managing connections between components within a platform.
Figure 6:
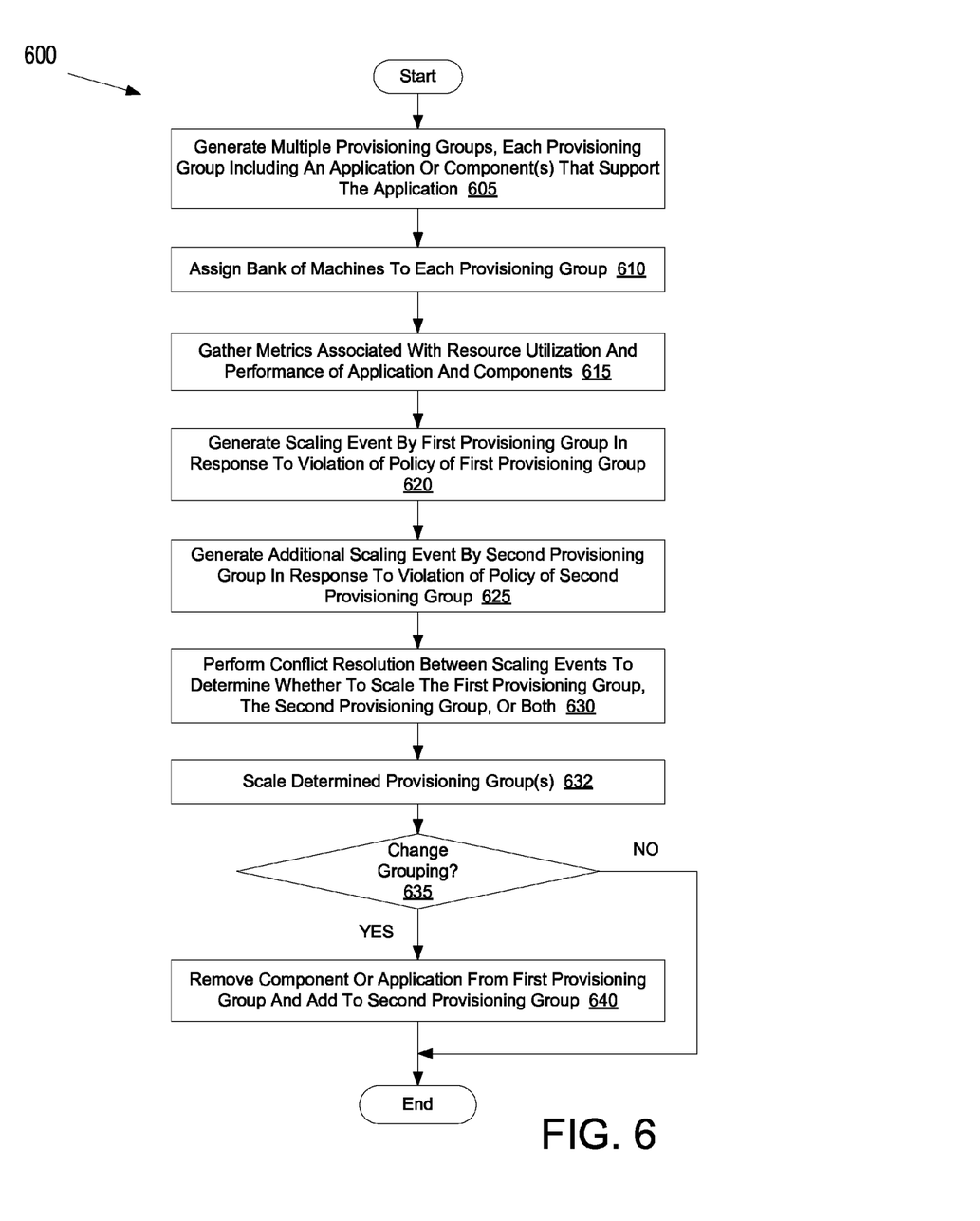
FIG. 6 is a flow diagram of another embodiment for a method of automatically scaling an application.

FIGS. 4-6 are flow diagrams of various embodiments of methods for managing a platform as a service (PaaS). The methods are performed by processing logic that may comprise hardware (circuitry, dedicated logic, etc.), software (such as is run on a general purpose computer system or a dedicated machine), or a combination of both. In one embodiment, the methods are performed by the platform 154 running on the host 110, 120, and in particular by a module or modules of a platform core within the platform 154.

FIG. 4 is a flow diagram of one embodiment for a method 400 of automatically scaling an application. The application may be hosted by a platform that is provided as a platform as a service (PaaS). At block 405, processing logic provides support components for an application. The support components and the application may run on one or multiple nodes. The nodes may be arranged in a single cluster, or may be divided into multiple clusters. For example, a first cluster of nodes may run the application, and a second cluster of nodes may run the support components. At block 410, processing logic monitors runtime behavior of the application and the support components. Monitoring the runtime behavior may include monitoring metrics associated with I/Os, CPUs, memory, lag, requests, and so forth.

At block 415, processing logic compares the runtime behavior to one or more scaling policies. At block 420, processing logic determines whether the runtime behavior violates any of the policies. If the runtime behavior violates a policy, the method continues to block 425. Otherwise, the method ends.

At block 425, processing logic generates a scaling event based on the violated scaling policy. At block 430, processing logic determines whether the scaling event violates a constraint. If the scaling event violates a constraint, the method ends. If the scaling event does not violate a constraint, the method continues to block 435, and processing logic automatically scales the application and/or components in accordance with the scaling event. Scaling the application and/or components may include provisioning a new node and adding the new node to an existing cluster. Scaling down the application and/or components may include shutting down an existing node.

FIG. 5 is a flow diagram of one embodiment for a method 500 of managing connections between components within a platform. At block 510, processing logic identifies connections between support components and between applications and support components.

At block 515, for each connection, processing logic identifies a first endpoint of the connection as a publisher of the connection and a second endpoint of the connection as a subscribed of the connection. Processing logic may additionally identify the second endpoint as a publisher of the connection and the first endpoint as a subscriber of the connection.

At block 520, processing logic monitors endpoint parameters of the first endpoint and/or the second endpoint for each connection. The nature of the endpoint parameters may depend on the type of connection. For example, endpoint parameters for a network connection may include an network address and port number. At block 525, processing logic determines whether the parameters of the first endpoint has changed. Processing logic may also determine whether the parameters of the second endpoint has changed. If the parameters of the first endpoint have changed, the method continues to block 530, and the processing logic updates the second endpoint that subscribes to the connection with the changed parameters. If an address of the second endpoint has changed, the method continues to block 530, and processing logic updates the first endpoint that subscribes to the connection with the changed parameters. If the first endpoint's parameters (and/or second endpoint's parameters) have not changed, the method ends.

FIG. 6 is a flow diagram of another embodiment for a method 600 of automatically scaling an application. The application may be hosted by a platform that is provided as a platform as a service (PaaS). At block 605, processing logic generates multiple provisioning groups. Each provisioning group may include an application (or one or more application components), one or more support components (e.g., cartridge components of a cartridge or platform components that are integrated into the platform), or a combination of the application and a support component or components. At block 610, processing logic assigns a bank of machines (e.g., a cluster of nodes) to each provisioning group.

At block 615, processing logic gathers metrics associated with resource utilization and performance of the application and the support components. The resource utilization and performance may be based on monitoring runtime behavior of the application and the support components.

At block 620, processing logic generates a scaling event for a first provisioning group in response to violation of a policy of the first provisioning group. At block 625, processing logic generates an additional scaling event for a second provisioning group in response to violation of a policy of the second provisioning group.

At block 630, processing logic performs conflict resolution between the scaling events to determine whether to scale the first provisioning group, the second provisioning group, or both. At block 632, processing logic scales the determined provisioning group or groups.

At block 632, processing logic determines whether to change any of the provisioning groups. Multiple different criteria may be used to determine whether to change any of the provisioning groups. Some criteria are resource availability criteria. For example, if processing logic determines that a provisioning group hosting a first component and a second component is undersized (e.g., has been provisioned with 4 GB VMs but one of the components has begun using almost the entire 4 GB), then processing logic may generate a new provisioning group and move the first component or second component to the new provisioning group. In this instance, it may be quicker and more efficient to break up the provisioning group than to continue to add new nodes to the existing provisioning group. Another criterion is a component scaling requirements criterion. Processing logic may determine scaling requirements for each component (or the scaling requirements may be provided). Processing logic may then compare the scaling requirements of components that share a provisioning group. If the scaling requirements of these components differ by more than a threshold amount, then the components may be divided into separate provisioning groups. Additionally, scaling requirements of components from different provisioning groups may be compared. If the scaling requirements of a first component from a first provisioning group and a second component from a second provisioning group are similar, and there are sufficient resources available on, for example, the second provisioning group, then the first component from the first provisioning group may be moved to the second provisioning group. If processing logic determines that a provisioning group is to be changed, the method proceeds to block 640. Otherwise, the method ends.

At block 640, processing logic removes a component or application from a first provisioning group and adds the component or application to a second provisioning group. In one embodiment, processing logic generates a new provisioning group, and moves the application or component to the new provisioning group.

Figure 7:
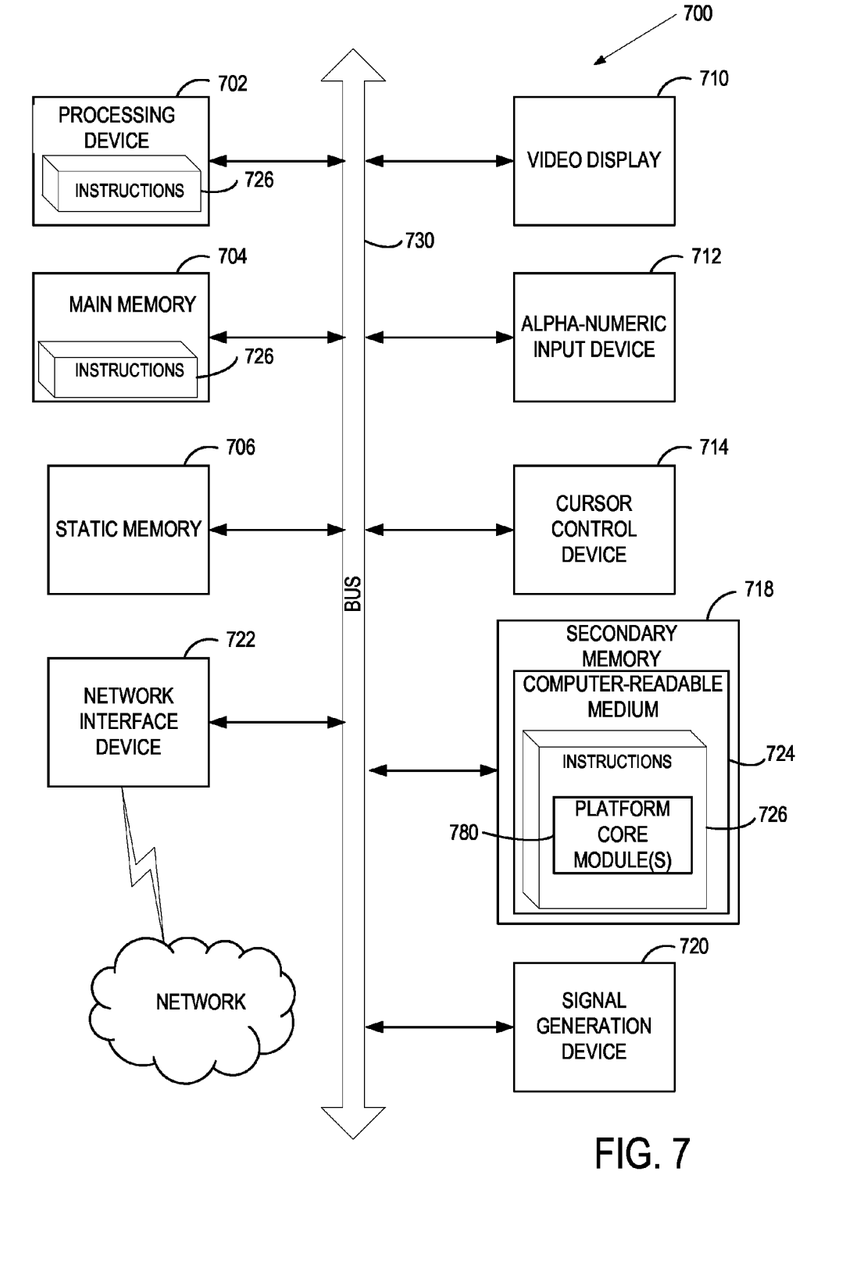
FIG. 7 illustrates a diagrammatic representation of a machine in the exemplary form of a computer system.

FIG. 7 is a diagram of one embodiment of a computer system for facilitating the execution of a web application in a cloud. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host 110, 120 in a cloud 130, a cloud provider system 104, a cloud controller 108 or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a secondary memory 718 (e.g., a data storage device in the form of a drive unit, which may include fixed or removable computer-readable storage medium), which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 718 may include a machine-readable storage medium (or more specifically a computer-readable storage medium) 724 on which is stored one or more sets of instructions 726 embodying any one or more of the methodologies or functions described herein. In one embodiment, the instructions 726 include instructions for one or more modules of a platform core 780. The instructions 726 may also reside, completely or at least partially, within the main memory 704 and/or within the processing device 702 during execution thereof by the computer system 700, the main memory 704 and the processing device 702 also constituting machine-readable storage media.

The computer-readable storage medium 724 may also be used to store the instructions 726 persistently. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 726, components and other features described herein can be implemented as discrete hardware components or integrated in the functionality of hardware components such as ASICS, FPGAs, DSPs or similar devices. In addition, the instructions 726 can be implemented as firmware or functional circuitry within hardware devices. Further, the instructions 726 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing," "generating," "monitoring," "scaling," "updating," "gathering," "storing," "accessing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Thus, a method and apparatus for automatically establishing a support environment for a program is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:

providing a plurality of components that support execution of an application, wherein the plurality of components and the application are hosted by a plurality of nodes arranged in a plurality of clusters, wherein the plurality of clusters have a plurality of scaling polices, wherein a first scaling policy in the plurality of scaling policies applies to a first cluster in the plurality of clusters, and wherein a second scaling policy in the plurality of scaling policies applies to a second cluster in the plurality of cluster;

monitoring, at the plurality of nodes, a first runtime behavior and a second runtime behavior of the application and the plurality of components, wherein the first runtime behavior occurs in the first cluster and the second runtime behavior occurs in the second cluster;

generating, by a first processing device in the first cluster, a first scaling event in view of a comparison of the first runtime behavior of the application or one of the plurality of components in the first cluster to the first scaling policy;

generating, by a second processing device in the second cluster, a second scaling event in view of a comparison of the second runtime behavior of the application or one of the plurality of components in the second cluster to the second scaling policy;

performing conflict resolution between the first scaling event and the second scaling event to determine which of the first scaling event or the second scaling event to process in view of determining that processing both the first scaling event and the second scaling event causes at least one of the first scaling event or the second scaling event to violate a constraint on resources within the first cluster or the second cluster; and automatically scaling at least one of the application or a component in the plurality of components in view of processing the first scaling event or the second scaling event, wherein the scaling comprises adding a new node to the first cluster or the second cluster or removing an existing node from the first cluster or the second cluster in view of processing the first scaling event or the second scaling event.

2. The method of claim 1, wherein monitoring the first runtime behavior and the second runtime behavior comprises:

gathering metrics associated with resource utilization and performance of each of the application and the plurality of components; and storing the metrics.

3. The method of claim 1, wherein each of the plurality of nodes is a virtual machine, and wherein adding the new node to the first cluster or the second cluster comprises:
  instructing an underlying infrastructure to allocate a new virtual machine;
  loading at least one of the application or the component onto the new virtual machine; and
  adjusting a load balancing of the first cluster or the second cluster to utilize the new node.

4. The method of claim 1, further comprising:
  managing a plurality of connections between the plurality of components and between the application and the plurality of components; and
  updating at least one of the plurality of connections after performing the scaling.

5. The method of claim 4, wherein the plurality of connections are managed as publish-subscribe services, wherein a first endpoint of a connection in the plurality of connections is a publisher of the connection and a second endpoint of the connection is a subscriber of the connection, and wherein the method further comprises:
  monitoring an address of the first endpoint; and
  reporting changes in the address of the first endpoint to the second endpoint to maintain the connection.

6. The method of claim 1, further comprising:
  generating a plurality of provisioning groups, wherein each of the plurality of provisioning groups comprises at least one of the application or one of the plurality of components, and wherein each of the plurality of provisioning groups further comprises a distinct cluster in the plurality of clusters to host the provisioning group.

7. The method of claim 6, wherein the first scaling event is associated with a first provisioning group in the plurality of provisioning groups and is generated in view of the comparison of the first runtime behavior for the first provisioning group to the first scaling policy for the first provisioning group, and wherein the new node is added to the first cluster for the first provisioning group.

8. The method of claim 6, wherein the second scaling event is associated with a second provisioning group in the plurality of provisioning groups and is generated in view of the comparison of the second runtime behavior for the second provisioning group to the second scaling policy for the second provisioning group, and wherein the existing node is removed from the second cluster for the second provisioning group.

9. The method of claim 6, further comprising:
  modifying the plurality of provisioning groups during runtime of the application by removing the application or the component from a first provisioning group in the plurality of provisioning groups and adding the removed application or the removed component to a second provisioning group in the plurality of provisioning groups.

10. A non-transitory computer readable storage medium having instructions stored therein which, when executed by a processing device, cause the processing device to perform operations comprising:
  providing a plurality of components that support execution of an application, wherein the plurality of components and the application are hosted by a plurality of nodes arranged in a plurality of clusters, wherein the plurality of clusters have a plurality of scaling polices, wherein a first scaling policy in the plurality of scaling policies applies to a first cluster in the plurality of clusters, and wherein a second scaling policy in the plurality of scaling policies applies to a second cluster in the plurality of cluster;
  monitoring, at the plurality of nodes, a first runtime behavior and a second runtime behavior of the application and the plurality of components, wherein the first runtime behavior occurs in the first cluster and the second runtime behavior occurs in the second cluster;
  generating, by a first processing device in the first cluster, a first scaling event in view of a comparison of the first runtime behavior of the application or one of the plurality of components in the first cluster to the first scaling policy;
  generating, by a second processing device in the second cluster, a second scaling event in view of a comparison of the second runtime behavior of the application or one of the plurality of components in the second cluster to the second scaling policy;
  performing conflict resolution between the first scaling event and the second scaling event to determine which of the first scaling event or the second scaling event to process in view of determining that processing both the first scaling event and the second scaling event causes at least one of the first scaling event or the second scaling event to violate a constraint on resources within the first cluster or the second cluster; and
  automatically scaling at least one of the application or a component in the plurality of components in view of processing the first scaling event or the second scaling event, wherein the scaling comprises adding a new node to the first cluster or the second cluster or removing an existing node from the first cluster or the second cluster in view of processing the first scaling event or the second scaling event.

11. The non-transitory computer readable storage medium of claim 10, wherein monitoring the first runtime behavior and the second runtime behavior comprises:
  gathering metrics associated with resource utilization and performance of each of the application and the plurality of components; and
  storing the metrics.

12. The non-transitory computer readable storage medium of claim 10, wherein each of the plurality of nodes is a virtual machine, and wherein adding the new node to the first cluster or the second cluster comprises:
  instructing an underlying infrastructure to allocate a new virtual machine;
  loading at least one of the application or the component onto the new virtual machine; and
  adjusting a load balancing of the first cluster or the second cluster to utilize the new node.

13. The non-transitory computer readable storage medium of claim 10, the operations further comprise:
  managing a plurality of connections between the plurality of components and between the application and the plurality of components; and
  updating at least one of the plurality of connections after performing the scaling.

14. The non-transitory computer readable storage medium of claim 13, wherein the plurality of connections are managed as publish-subscribe services, wherein a first endpoint of a connection in the plurality of connections is a publisher of the connection and a second endpoint of the connection is a subscriber of the connection, and wherein the operations further comprise:
  monitoring an address of the first endpoint; and
  reporting changes in the address of the first endpoint to the second endpoint to maintain the connection.

15. The non-transitory computer readable storage medium of claim 10, the operations further comprise:
  generating a plurality of provisioning groups, wherein each of the plurality of provisioning groups comprises at least one of the application or one of the plurality of components, and wherein each of the plurality of provisioning groups further comprises a distinct cluster in the plurality of clusters to host the provisioning group.

16. The non-transitory computer readable storage medium of claim 15, wherein the first scaling event is associated with a first provisioning group in the plurality of provisioning groups and is generated in view of the comparison of the first runtime behavior for the first provisioning group to the first scaling policy for the first provisioning group, and wherein the new node is added to the first cluster for the first provisioning group.

17. The non-transitory computer readable storage medium of claim 15, wherein the second scaling event is associated with a second provisioning group in the plurality of provisioning groups and is generated in view of the comparison of the second runtime behavior for the second provisioning group to the second scaling policy for the second provisioning group, and wherein the existing node is removed from the second cluster for the second provisioning group.

18. The non-transitory computer readable storage medium of claim 15, the operations further comprise:
  modifying the plurality of provisioning groups during runtime of the application by removing the application or the component from a first provisioning group in the plurality of provisioning groups and adding the removed application or the removed component to a second provisioning group in the plurality of provisioning groups.

19. A system comprising:
  a plurality of storage devices to store and provide an application and a plurality of components that support execution of the application; and
  a plurality of processing devices having a plurality of nodes that host the plurality of components and the application, wherein the plurality of nodes are arranged in a plurality of clusters, wherein the plurality of clusters have a plurality of scaling polices, wherein a first scaling policy in the plurality of scaling policies applies to a first cluster in the plurality of clusters, and wherein a second scaling policy in the plurality of scaling policies applies to a second cluster in the plurality of cluster, the plurality of processing devices to:
  monitor a first runtime behavior and a second runtime behavior of the application and the plurality of components, wherein the first runtime behavior occurs in the first cluster and the second runtime behavior occurs in the second cluster;
  generate, by a first processing device in the plurality of processing devices in the first cluster, a first scaling event in view of a comparison of the first runtime behavior of the application or one of the plurality of components in the first cluster to the first scaling policy;
  generate, by a second processing device in the plurality of processing devices in the second cluster, a second scaling event in view of a comparison of the second runtime behavior of the application or one of the plurality of components in the second cluster to the second scaling policy;
  perform conflict resolution between the first scaling event and the second scaling event to determine which of the first scaling event or the second scaling event to process in view of a determination that processing both the first scaling event and the second scaling event causes at least one of the first scaling event or the second scaling event to violate a constraint on resources within the first cluster or the second cluster; and
  automatically scale at least one of the application or a component in the plurality of components by addition of a new node to the first cluster or the second cluster or removal of an existing node from the first cluster or the second cluster in view of the first scaling event or the second scaling event.

20. The system of claim 19, wherein the plurality of processing devices is to monitor the first runtime behavior and the second runtime behavior by collection of metrics associated with resource utilization and performance of each of the application and the plurality of components and storage of the metrics.

* * * * *